(12) United States Patent
Rancien

(10) Patent No.: US 8,121,386 B2
(45) Date of Patent: Feb. 21, 2012

(54) SECURE ARTICLE, NOTABLY A SECURITY AND/OR VALUABLE DOCUMENT

(75) Inventor: Sandrine Rancien, La Murette (FR)

(73) Assignee: Arjowiggins, Issy les Moulineaux (FR)

( * ) Notice: Subject to any disclaimer, the term of this patent is extended or adjusted under 35 U.S.C. 154(b) by 751 days.

(21) Appl. No.: 11/991,739

(22) PCT Filed: Sep. 15, 2006

(86) PCT No.: PCT/FR2006/050897
§ 371 (c)(1),
(2), (4) Date: Nov. 4, 2008

(87) PCT Pub. No.: WO2007/031695
PCT Pub. Date: Mar. 22, 2007

(65) Prior Publication Data
US 2009/0074231 A1     Mar. 19, 2009

(30) Foreign Application Priority Data
Sep. 15, 2005     (FR) ...................................... 05 52777

(51) Int. Cl.
*G06K 9/00* (2006.01)
*B42D 15/00* (2006.01)

(52) U.S. Cl. ........................... 382/141; 283/85; 382/100

(58) Field of Classification Search .................. 382/100, 382/141; 283/72, 74, 85
See application file for complete search history.

(56) References Cited

U.S. PATENT DOCUMENTS

| | | | |
|---|---|---|---|
| 3,636,318 A | 1/1972 | Lindstrom et al. | |
| 4,114,032 A | 9/1978 | Brosow et al. | |
| 4,290,630 A | 9/1981 | Lee | |
| 4,629,215 A | 12/1986 | Maurer et al. | |
| 4,661,983 A * | 4/1987 | Knop ............................ 382/112 |
| 4,686,527 A | 8/1987 | Goldman | |
| 4,807,287 A | 2/1989 | Tucker et al. | |
| 4,837,840 A | 6/1989 | Goldman | |
| 5,601,931 A | 2/1997 | Hoshino et al. | |
| 5,756,220 A | 5/1998 | Hoshino et al. | |
| 6,106,021 A | 8/2000 | Phillips | |
| 6,286,761 B1 | 9/2001 | Wen | |
| 6,394,358 B1 | 5/2002 | Thaxton et al. | |

(Continued)

FOREIGN PATENT DOCUMENTS

EP     0 589 195 A2     3/1994

(Continued)

OTHER PUBLICATIONS

Third Party Opposition filed on behalf of Leonhard Kurz Stiftung & Co. KG in European Patent Application No. EP 1941101 B1 dated Aug. 10, 2010 (with translation).

(Continued)

*Primary Examiner* — Michael A Lyons
(74) *Attorney, Agent, or Firm* — Oliff & Berridge, PLC

(57) ABSTRACT

A secure article, notably a security and/or valuable document, comprising at least one substrate, at least one visible authenticating structure, at least one inspection zone defined at least partly by the authenticating structure, the authenticating structure delimiting at least partly the outline of the inspection zone and/or serving to locate the inspection zone, in the inspection zone at least one identifying element different from the authenticating structure, the inspection zone enabling an identification information to be supplied with at least one feature, notably spatial or physical, of the identifying element.

66 Claims, 4 Drawing Sheets

U.S. PATENT DOCUMENTS

| | | |
|---|---|---|
| 6,505,779 B1 | 1/2003 | Power et al. |
| 6,530,602 B1 | 3/2003 | Stenzel et al. |
| 6,804,379 B2 * | 10/2004 | Rhoads .................. 382/101 |
| 6,978,036 B2 * | 12/2005 | Alattar et al. .................. 382/100 |
| 7,239,734 B2 * | 7/2007 | Alattar et al. .................. 382/135 |
| 2002/0008380 A1 | 1/2002 | Taylor et al. |
| 2002/0061120 A1 | 5/2002 | Carr et al. |
| 2003/0164611 A1 | 9/2003 | Schneider et al. |
| 2004/0113420 A1 | 6/2004 | Han et al. |
| 2005/0067489 A1 | 3/2005 | Jones et al. |
| 2005/0269818 A1 * | 12/2005 | Forde .......................... 283/74 |
| 2007/0194934 A1 | 8/2007 | Tauber |

FOREIGN PATENT DOCUMENTS

| | | |
|---|---|---|
| EP | 0 625 766 A2 | 11/1994 |
| EP | 0 690 939 B1 | 12/1999 |
| FR | 2 324 060 | 4/1977 |
| FR | 2 765 014 A1 | 12/1998 |
| GB | 2 324 065 A | 10/1998 |
| JP | H7-214955 | 8/1995 |
| JP | A-09-069259 | 3/1997 |
| JP | 2004-501809 | 1/2004 |
| JP | 2006-52488 | 2/2006 |
| JP | 2006-205674 | 8/2006 |
| WO | WO 95/10420 A1 | 4/1995 |
| WO | WO 99/17486 A1 | 4/1999 |
| WO | WO 02/02350 A1 | 1/2002 |
| WO | WO 02/50790 A1 | 6/2002 |
| WO | WO 03/054297 A2 | 7/2003 |
| WO | WO 2004/069560 A2 | 8/2004 |
| WO | WO 2005/010814 A1 | 2/2005 |
| WO | WO 2005/025891 A2 | 3/2005 |

OTHER PUBLICATIONS

Third Party Opposition filed on behalf of Sicpa Holding SA in European Patent Application No. EP 1941101 B1 dated Aug. 10, 2010 (with translation).

Office Action issued May 27, 2011 in Japanese Patent Application No. 2008-530588.

* cited by examiner

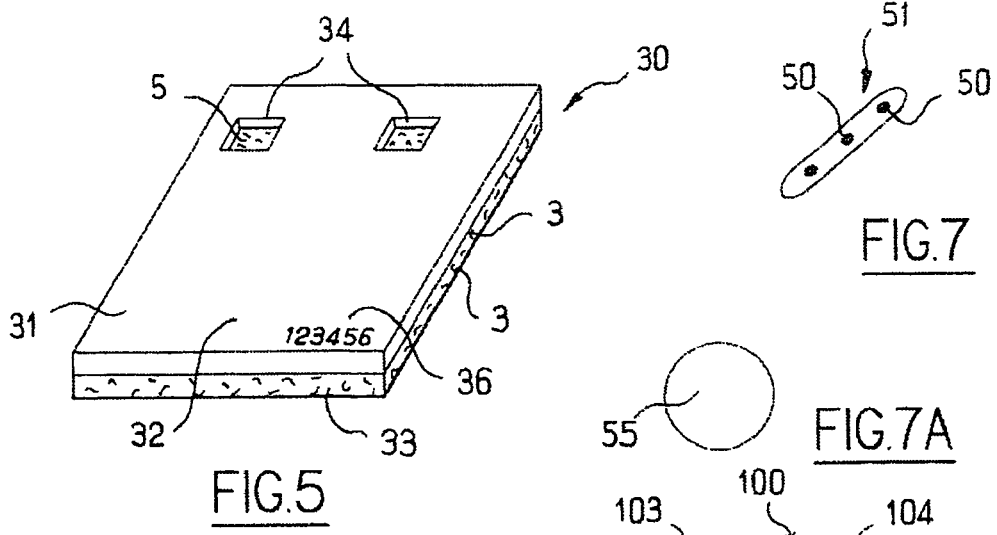
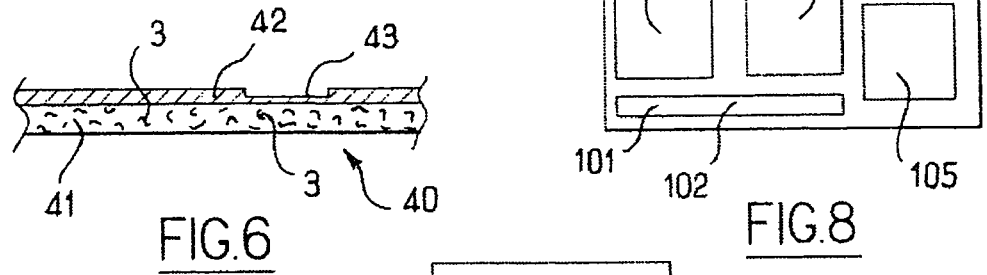
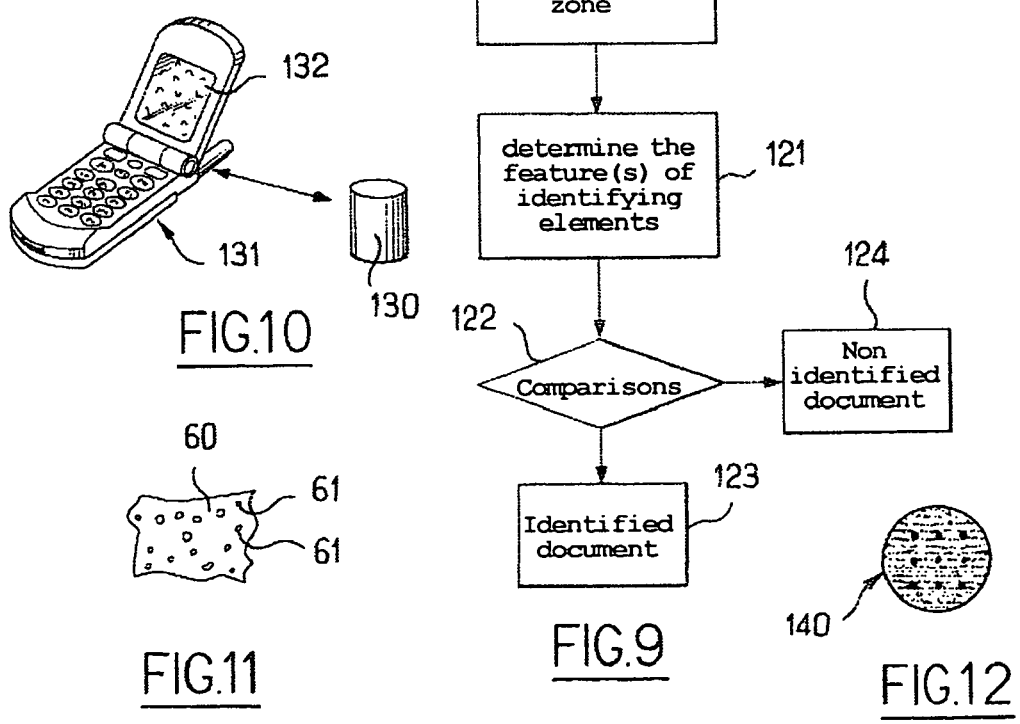

SECURE ARTICLE, NOTABLY A SECURITY AND/OR VALUABLE DOCUMENT

BACKGROUND

This invention relates notably to a secure article, notably a security and/or valuable document, and a material for achieving such an article.

Security and/or valuable documents are known, comprising security elements enabling to protect these documents against any forgery or counterfeit attempt.

Among the security elements, some of them can be detected with the naked eye, in visible light, without using any specific apparatus. These security elements comprise for example one watermark, some coloured fibres or flakes, some printed, metallic or holographic yarns, some holographic foils or some prints with variable optical effect.

These security elements are said to be of first level.

Other types of security elements can only be detected using a relatively simple apparatus such as a UV or infrared-emitting lamp. These security elements comprise for instance fibres, flakes, strips, yarns or particles. These security elements can be visible to the naked eye or not, being luminescent under the lighting of a Wood lamp, emitting in a wavelength of 365 nm for example.

These security elements are said to be of second level.

Other types of security elements still require a more sophisticated detector for their detection. These security elements are, for instance, able to generate a specific signal when they are submitted, simultaneously or not, to one or more external excitation sources. The automatic detection of the signal enables to authenticate the document, if necessary.

These security elements comprise, for example, some tracers in the form of active material, particles or fibres, able to generate a specific signal when these tracers are submitted to an optoelectronic, electric, magnetic or electromagnetic excitation.

These security elements are said to be of third level.

Some tracers randomly scattered within the document can serve to identify, by forming a single signature of the document, based, for instance, on the intensity and/or the type of signal generated by the tracers, considered individually and/or together, the density of tracers or the geographical distribution of tracers in a predefined zone of the document.

Some tracers that can be used for identifying a document, comprising, for example, soft magnetic fibres whose response to an external magnetic field is non-linear, the magnetization of fibres varying according to the hysteresis loop. A set of fibres present in a predetermined zone of the document enables to delimit a single signature of the document because of the distribution, the orientation and the random number of fibres existing in the above-mentioned zone. In the case of a passport and notably a visa page, the magnetic fibres can be present on a page in which the customization related to the passport holder is achieved. This customization, according to the ICAO (*International Civil Aviation Organization*) recommendations comprises the printing of one coded line in the page border from customization data. This OCR (*Optical Character Recognition*) line is automatically controlled by an appropriate optical control system. The optical control system can be adapted, so that when reading the OCR line, an identification of the signal generated under a magnetic field by the magnetic fibres present in the inspected zone by the optical control system could be also carried out.

The tracers composed of metallic fibres having a specific response by reflection and by transmission to an excitation of microwave type, can still be used.

The tracers marketed under the name of Trace-less™ by the CREO Company are also known. These tracers consisting of particles are invisible after insertion into the document to be protected and can be detected thanks to a specific electromagnetic response when submitted to an excitation in the field of infrared. The enabled identification of a document comprising such particles is based on the verification of the particles distribution in a predefined zone, this verification being notably carried out by means of an image of particles observed under an appropriate electromagnetic source. The considered inspection zone can rely, for example, on the character outline that is printed on the document at a later date.

The microscopic particles marketed under the name of Nanoplex® by the NANOBARCODES Company can be used in a document for identification through optical analysis of an image. These particles present a cylinder shape with variable reflectance zones obtained by stacking different metals, which enables to create varied optical codes according to the sequence of metals used. The detection of particles on a document for authentication is carried out by means of an optical microscope. The identification of document can, further, be automatically carried out by randomly incorporating on the latter, particles of different codes, and by checking through image analysis, for a predetermined zone of the document, the respective percentage of each type of particles and their spatial distribution in the above-mentioned zone.

For a document incorporating excitable luminescent particles through a radiation at 365 nm, marketed under the name of Polystar™ by the SPECTRA SYSTEMS Company, the document identification is carried out with a portable system fitted with a digital camera, marketed under the name of Vericam™, by analysing the spectral emission, namely the fluorescence "colour" of particles, as well as the density of particles for each of the "colours".

The HYPERLABEL TECHNOLOGIES Company has developed an active material. Formulated in an ink, this one is printed by ink jet printing on a document or article to be traced, in the form of a microscopic code of matrix code type. This invisible code is presently printed in a redundant manner in certain sections of the document to be traced to make the identification process possible, even if the code on the document surface is partly altered, as well as to facilitate this identification process notably because of the tolerance in placing a reading system on the zone to be controlled. The code is read by means of a system equipped with a digital camera functioning in infrared. The inspection zone of the printed code is defined thanks to the printing of specific marks around each code, each code being located as it were, in the middle of a box of a grid with marked intersections. This way of delimiting the inspection zone by printing can constitute, in some cases, a constraint.

The document entitled "Secure fingerprint of packaging and documents without tags, chips or ink" by Russel Cowburn from the Imperial College of London discloses a method for reading one paper signature by using the scanning of a paper zone in order to determine the 3D topography of the paper. The scanned paper zone rests on a border and/or corner of the paper. When the border or the corner is damaged, the reading becomes more difficult, even impossible.

The international application WO 2005/025891 discloses a banknote comprising on one side a holographic strip with windows, through which some identifying elements such as a watermark or fluorescent particles can be detected.

The patent application US 2004/0113420 discloses a card comprising one plastic substrate. Fibres are scattered at random on one substrate side while being slightly squeezed in the substrate mass. A metallic layer is formed on this substrate side, so that it could partly cover the fibres. The metallic layer comprises windows for detecting the fibres. The card identification is carried out by detecting the presence of fibres through the above-mentioned windows by scanning according to one or more straight lines by means of a detection device.

The application FR 2 324 060 further discloses a paper and/or synthetic document, incorporating magnetic fibres scattered at random within the document. The document authentication relies on the detection of fibres in the scanning zone, by means of a magnetic head.

The application FR 2 765 014 discloses a paper document incorporating magnetic flakes. The document comprises an invisible bar code directly linked to the random distribution of flakes in a zone of the document.

The application GB 2 324 065 A discloses a tag including randomly scattered particles. This tag can be incorporated into a banknote during manufacturing, and consequently it is not necessarily visible by reflection to the naked eye or with a magnifying glass or any other magnifying accessory. A code associated with the distribution of particles can be stored in a database with the banknote serial number. In this application, the position of particles is measured in both dimensions for example, by being located with respect to one line, or in the three dimensions.

The U.S. Pat. No. 4,114,032 patent describes a document incorporating magnetic fibres, the reading of a signal linked to these fibres is carried out according to a specific path.

Notably, there is a need to improve the identification method and make it reliable by automatic reading of tracers inserted into a substrate and also to further strengthen the protection of security and/or valuable documents against forgery and counterfeit.

SUMMARY

The aim of the present invention is thus, according to one of its aspects, a secured article, notably a security and/or valuable document, comprising:
- at least one substrate, which can be fibrous,
- at least one authenticating structure,
- at least one inspection zone, defined at least partly by the authenticating structure,
- in the inspection zone, at least one identifying element different from the authenticating structure.

The inspection zone can enable identification information to be supplied with at least one feature, notably spatial and/or physical, of which at least one identifying element.

The authenticating structure can be a first-level security element, being visible, notably by reflection or transmission. The term "visible" means it can be observed under natural, artificial light, UV or IR, with the naked eye or possibly using a magnifying glass or any other magnifying accessory. The observation can be directly made with no need of image analysis.

The authenticating structure can delimit, at least partly, the outline of the inspection zone and/or serve to locate the inspection zone.

The term "locate" means the authenticating structure can serve as a reference system in determining at least one physical and/or spatial feature in the inspection zone, the spatial distribution of identifying elements for example. This distribution can be determined by taking a reference point (mathematically speaking) defined by the authenticating structure itself, and not by a print-out of the article, for example.

Preferably, the article is associated with at least a piece of identification information linked to at least one feature, notably spatial and/or physical, of the inspection zone, and notably at least one identifying element. The identification information can represent the distribution of identifying elements.

This information can be present on the article, if necessary.

Thanks to the invention, the authenticating structure can serve, on the one hand, to authenticate the secured article and, on the other hand, to delimit at least partly, the inspection zone enabling to identify the article.

Thus, according to the present invention the protection of the article against a forgery and/or counterfeit attempt is made more difficult, notably in relation to existing documents, on which the inspection zone is defined by a printed pattern that can be more easily forged.

Moreover, the invention can be used to improve and make reliable the identification process of tracers inserted into the substrate, by using an inspection zone that doesn't rely on delimiting by printing the outline or marks using variable non-optical ink, such delimiting can be subject to mechanical or chemical wear, accidental or not.

The outline of the inspection zone can, if necessary, be physically defined by the authenticating structure. Alternatively, the authenticating structure serves to locate the inspection zone, without, however, physically delimiting the outline. The inspection zone can be located within the authenticating structure, coincide with it or stick out from it.

The signature of the secured article can be based either exclusively on the identifying element(s) present in the inspection zone, or on the combination of the identifying element(s) in the inspection zone and the portion of substrate in the inspection zone.

The authenticating structure and the identifying element can be made interdependent with the substrate in various ways.

Advantageously, at least one of the authenticating structure and the identifying element is at least partly, notably completely, drowned within the substrate, which makes any extracting attempt of the authenticating structure or the identifying element difficult, even impossible.

In an exemplary embodiment of the invention, the article comprises a plurality of scattered identifying elements, notably at random, within the inspection zone, and the identification information presents a link with one feature, notably spatial and/or physical, of said plurality of identifying elements, individually or as a whole.

The identifying element(s) can, if necessary, be arranged to form a code, a matrix code for example that can be read by an appropriate reading device.

The authenticating structure can hold a predetermined or, alternatively, a random location of the article.

In an exemplary embodiment of the invention, the authenticating structure can be detected with the naked eye, by reflection and/or transparency, in visible light.

Alternatively, the authenticating structure can be detected with the naked eye, by reflection and/or transparency, under a predetermined lighting, notably ultraviolet, the authenticating structure being especially detectable in visible light.

If necessary, the identifying elements cannot be detected with the naked eye, notably whatever the lighting condition may be.

In an exemplary embodiment of the invention, the identifying elements can be arranged to emit a specific signal when they are submitted to an external, notably optoelectronic, electromagnetic, electric, magnetic, thermal or acoustic excitation.

The external excitation can be an infrared radiation, for example.

The feature can be related to the type of the identifying element(s) in the inspection zone.

The physical feature linked to the identification information can correspond to an optical, electro-magnetic, electric, magnetic, thermal or acoustic feature of the identifying element(s) in the inspection zone.

Alternatively, the spatial feature linked to the identification information can be related to the arrangement, the size and/or the density per unit area or volume unit of the identifying element(s) in the inspection zone.

In an exemplary embodiment of the invention, the authenticating structure comprises one medium of at least one identifying element.

The medium can comprise at least one strip element, for example a plastic one, with a width lower than that of the article, the strip element being, notably, incorporated at least partly into one article substrate, notably one fibrous substrate.

The strip element can, if desired, be stretched from the article border to a second border, facing the first one.

The substrate can comprise at least one window, through which the strip element can be at least partly exposed to the exterior, the inspection zone then being defined at least partly by the window for example.

The substrate can comprise, if necessary, two windows, opposite each other and through which the strip element can be at least partly visible from both opposite sides of the substrates.

The medium can also comprise at least one fibre or one flake and the inspection zone can be defined at least partly by the outline of the fibre or the flake.

The fibre or the flake can be visible to the naked eye.

The fibre or the flake can comprise a plurality of zones, notably having different physical properties, for example different colours and/or reflectances, and any of them or a combination of them forming an identifying element.

In an exemplary embodiment of the invention, the authenticating structure comprises at least one fibre, notably one luminescent fibre that can be detected by exposure to a radiation of 365 nm, this fibre carrying a plurality of particles, notably the Traceless™ particles from the CREO company, forming together one identifying element characterised, notably, by a specific spectral response when the fibre is submitted to a given electromagnetic field.

In another exemplary embodiment of the invention, the authenticating structure comprises at least one flake that is notably paper-based, disc-shaped for example and that can, if desired, be coloured. The flake advantageously receives the printing of an ink incorporating an active material so as to form a code, notably a matrix code. This ink can, if necessary, be invisible to the naked eye. This code forms an identifying element and the inspection zone is defined by the flake outline. The above-mentioned ink and code can be the ones developed by the HYPERLABEL TECHNOLOGIES Company.

In an exemplary embodiment of the invention, the article comprises at least one first authenticating structure of a first type and one plurality of second authenticating structures of a second type, different from the first one.

The second authenticating structures are, preferably, randomly scattered within the first inspection zone defined at least partly by the first authenticating structure. These second authenticating structures de-limit, notably according to their position, frequency and/or distribution compared with the first structure, a single signature allowing the article to be identified, which signature results from the combination of the first and second structures.

At least one of the second authenticating structures can comprise one medium, such as a fibre or a flake, of at least one identifying element.

As previously described, the medium outline, such as a fibre or a flake, delimits a second inspection zone of identifying element(s).

The authentication of the article can be carried out, if necessary, based on the first and second authenticating structures. The identification of the article can be also carried out in two different ways thanks to the first and second inspection zones.

The substrate can comprise, if necessary, some fibres, particles or flakes of at least two different types, for example in type, shape, size, section and/or different visual effect and/or of multicomponent type, the inspection zone being defined by the outline of one of at least these elements.

In an exemplary embodiment of the invention, the identifying elements can be scattered within a zone of the article, having an area inferior or superior to that of the authenticating structure, the identifying elements being, for example, scattered on the whole article surface.

The article can comprise one substrate, notably fibrous, and the substrate can incorporate or carry at least one identifying element.

The identifying elements can, if necessary, be scattered, notably at random, within the substrate in an area zone lower than the substrate area, this zone presenting a strip shape for example.

If necessary, the article comprises several strips of the above-mentioned type, spaced apart from each other by a predefined or variable pitch, the pitch value or its frequency can be used to delimit a signature.

In an exemplary embodiment of the invention, the authenticating structure and the substrate are distinct.

The authenticating structure can, for example, be laid down on one side of the substrate, and comprise, for example, one strip, one film or one patch, this authenticating structure can be arranged, if necessary, to present an interfering, holographic, metallic or non metallic effect.

The authenticating structure, notably the strip, the film or the patch, can comprise at least one window delimiting at least partly the inspection zone, the window being, for example, formed by a demetallized zone or a punched zone of the authenticating structure.

In an exemplary embodiment of the invention, the authenticating structure comprises one coating, notably one surface application such as an iridescent coating, laid down onto the substrate, the coating presenting variable thickness zones or zones with different interfering effects arranged for delimiting the inspection zone.

If desired, the article, notably a document, can comprise one dual-jet paper, a first jet delimiting the substrate incorporating and/or carrying the identifying elements and the authenticating structure comprising at least one window achieved in a second jet and delimiting at least partly the inspection zone.

In an exemplary embodiment of the invention, the authenticating structure is carried out at least partly on said substrate.

The authenticating structure can comprise at least one watermark carried out on the substrate incorporating or carrying the identifying element(s).

The inspection zone can, notably, correspond to the zone covered by the authenticating structure, for example the watermark, or, alternatively, to the total surface of the article, with the exception of the zone covered by the authenticating structure.

At least one of the identifying elements can be chosen among:
- one heterogeneous element in a substrate of the article,
- one active material such as, for instance, an ultraviolet absorber chemical compound or elements that can be detected by X-ray fluorescence,
- one particle, notably luminescent and/or fluorescent, or presenting properties of magnetic resonance or predefined reflectance,
- one fibre such as a magnetic fibre, notably a soft magnetic metallic fibre,
- the 3D microstructure or topography of a paper substrate.

The identifying element(s) can comprise, for example, some particles of different types, having for example different reflectance properties, the identification being then especially based on the analysis of respective densities in any type of particle.

The identifying element(s) can comprise, if necessary, nanometric-sized elements scattered in the inspection zone, for instance nanofibres with a diameter of, for example, about 150 nm.

The article according to the invention is especially arranged, so that its authentication and/or identification couldn't require any material collection on the document.

When the article comprises one plastic substrate, the identifying elements can be formed by heterogeneous elements in the substrate, these heterogeneous elements being, for example, lacks of material within the substrate.

The substrate can include, for example, gas bubbles that are randomly scattered in one zone of this substrate.

The identifying elements are, for example, defined by the 3D microstructure or topography in one paper substrate.

The authenticating structure can comprise at least one of the following elements:
- one watermark,
- one fibre that appears, for example, coloured in daylight or only under a specific illumination, the fibre can have a cylindrical shape or not, with a non circular section, for instance,
- one flake appearing in daylight or only under a specific illumination, the flake can be, for instance, metallic or holographic on its whole surface or on only a portion of its surface, the flake can have a circular shape or not,
- one film or one printed, metallic or holographic strip,
- one printed, metallic or holographic foil,
- one print with variable optical effect.

The authenticating structure can, if necessary, differ from one print, notably of a visible ink in white light.

The authenticating structure can, for example, differ from a bar code printed with a conventional ink, with no variable optical effect.

The authenticating structure can especially be arranged to present a variable optical effect.

In an exemplary embodiment of the invention, the identifying element(s) can be present at random within the substrate, the latter being, for example, rolled on its whole surface with an authenticating structure presented in the form of a security laminate with visual effect, for example a holographic film.

The authenticating structure can comprise one window or one zone presenting physical properties differing from the rest of the authenticating structure.

The authenticating structure, for example the film, can comprise at least one zone, outside the window, arranged for screening an excitation signal serving to excite the identifying element(s) present on the substrate.

The window can correspond to a zone presenting a lenticular screen.

The delimiting of the inspection zone can thus be both optical, notably through delimiting a visible zone, and physical, notably through using a material absorbing or reflecting the excitation signal outside the inspection zone.

The inspection zone can be smaller than the zone delimited by the authenticating structure, the authenticating structure can, if necessary, serve as a reference point of spatial coordinates x, y, z for locating the inspection zone.

In an exemplary embodiment of the invention, the identification information comprises the spatial and/or physical feature, in a way that can be directly comprehended or not, the information being, for example, encrypted.

Alternatively, the identification information enables to retrieve the spatial and/or physical feature stored on a distinct medium of the article, the identification information comprising, for example, one article identifier.

The identification information can contain or serve to retrieve one image of identifying elements contained in the inspection zone.

The article can, if necessary, comprise at least one data medium able to store the identification information, chosen especially among:
- an optical device, notably a bar code,
- an electronic device able to store data, comprising, notably a chip,
- a magnetic track,
- an optical memory.

Preferably, the article comprises at least one apparent quotation. "Apparent quotation" notably means an information element, for example, a text, an image or a logo, visible on the article.

The apparent quotation comprises, for example, at least one element concerning the civil status of an individual, notably, the name, the first name and the nationality and/or one biometric parameter, for example, the height, the weight and the hair or eyes colour.

The apparent quotation can comprise, if necessary, one image, one identity photograph for example.

When the article is a valuable document such as a banknote, the apparent quotation can comprise, for example, one serial number.

The apparent quotation can be printed.

Advantageously, the identification information enables to have access to a piece of information representing at least one apparent quotation, appearing on the article. It is thus possible to set up a univocal relation between the article and one or several apparent quotations appearing on the latter.

In an exemplary embodiment of the invention, the article comprises at least one fibrous substrate, notably in paper. Alternatively, the article can comprise one plastic substrate.

In an exemplary embodiment of the invention, the article comprises:
- at least one fibrous substrate,
- possibly at least one surface layer, notably binder-based, laid down onto one substrate side,
- one plurality of heterogeneous elements of the substrate and/or the possible surface layer, scattered, notably at random, within the substrate and/or the possible surface layer,
- at least one authentication and/or identification information linked to at least one spatial and/or physical feature of one portion at least of said heterogeneous elements.

The heterogeneous elements according to the invention are notably different from heterogeneous elements obtained by using one or more different solid material(s) for example.

Thanks to the invention, the heterogeneous elements of the fibrous substrate and/or the surface layer, in an inspection zone, can be used for forming a signature, notably, a three-dimensional one, associated with the article. This signature can be single because of the arrangement and the random size of heterogeneous elements.

Preferably, the heterogeneous elements are generated during the formation of the fibrous material substrate formation in the wet phase and correspond to fluctuations in the substrate mass density. These mass density fluctuations may be caused, notably, by gas injection during the wet phase when forming the substrate, and cause fluctuations in the optical properties of the substrate.

The heterogeneous elements may have, for example, a mass density smaller than that of the remainder of the substrate and form light-colored spots that are visually perceptible in transmitted light.

The heterogeneous elements may optionally be dispersed, in a privileged manner, in a defined area of the substrate, notably in an area bounded by a watermark such as by injecting one or more gases through small apertures, for example, formed on punches used to form the watermark, and attached to the rotary wire cylinder of the paper machine.

When the structure comprises a surface layer, the heterogeneous elements within this layer are notably generated when applying the surface layer to the previously formed substrate, wherein the heterogeneous elements correspond to fluctuations in the mass density of the surface layer. These mass density fluctuations may be caused, for example, by the release of the gas or gases that were trapped within the substrate during the drying phase, the gas or gases released by the substrate penetrating the surface layer, or also by intentionally injecting gas into the still wet surface before or during its application to the substrate. These heterogeneous elements within the surface layer generate fluctuations in its optical density.

The surface layer may notably be made of a binder and is advantageously arranged so as to provide the structure with specific printability characteristics and/or properties such as a variable optical effect.

The gas or gases used may be chosen so as to interact with one or more reactive areas in the substrate and/or in the optional surface layer so as to induce an optical and/or physical change in the heterogeneous elements. This change may correspond, for example, to the formation of a colored spot in one heterogeneous element.

Another aim of this invention, according to another aspect, is to provide a sheet material comprising:
  at least one first authenticating structure of a first type,
  at least one first inspection zone defined at least partly by the first authenticating structure,
  at least one plurality of second authenticating structures of a second type, different from the first one, any second authenticating structure comprising, for example, one fibre or one flake, the second authenticating structures being preferably randomly scattered within the first inspection zone,
  at least one second inspection zone defined at least partly by at least one of the second authenticating structures, being, for instance, defined by the outline of one second authenticating structure,
  in the second inspection zone, at least one identifying element differing from the second authenticating structure.

Another aim of the present invention, according to another of its aspects, is a method for authenticating and/or identifying an article, notably a security and/or valuable document, the article comprising:
  at least one authenticating structure,
  at least one inspection zone defined at least partly by the authenticating structure,
  in the inspection zone, at least one identifying element different from the authenticating structure.

The article can be at least associated with identification information linked to at least one feature, notably spatial and/or physical, in the inspection zone.

The method can comprise at least one of the authentication and identification of the article, the method being characterised in that the document authentication comprises the following steps:
  observing the authenticating structure, notably with the naked eye, by reflection and/or transparency, under a given lighting condition,
  concluding, thanks to observation, concerning the article authenticity
  and in that the article identification comprises the following steps of:
  possibly reading the identification information, automatically or not,
  comparing the inspection zone feature of the article being linked to the identification information, with at least one feature obtained from the article inspection zone,
  concluding, at least thanks to comparison, concerning the article identity.

The above-mentioned comparison is, for example, carried out between the first and second images, the first one being linked to the identification information and the second one being obtained from the article inspection zone, when identifying.

The comparison can be also carried out between the first and second values, the first one being obtained thanks to the identification information and the second one being measured on the article inspection zone.

The inspection zone feature is, for example, the spatial distribution of a plurality of identifying elements and this distribution can be determined from a reference point defined by the authenticating structure and not by a printed mark with a non optical variable ink.

The document identification can, if necessary, be automatically achieved.

In an exemplary embodiment of the invention, the authenticating structures are visible to the naked eye, notably without the help of an instrument such a microscope.

The method can comprise the following step of:
  locating the inspection zone through the image analysis of the article, for example by means of at least one sensor, for example a set of sensors, functioning in visible light or in infrared.

The image analysis can, for example, be carried out by means of a CCD camera or a CMOS camera.

The article identification can comprise the following step of:
  comparing the arrangement of identifying elements in the article inspection zone with an image retrieved thanks to the identification information.

The document identification can also comprise the following steps of:
  measuring the signal intensity and/or determining the type of signal generated by the identifying elements in the inspection zone, notably when the identifying elements are submitted to an external excitation, comparing the measured signal intensity and/or the type of signal with a piece of data retrieved thanks to the identification information.

The detection can rest, if necessary, on the examination of noise event in the inspection zone.

The spatial and/or physical features serving for the signature, are linked to identifying elements, individually or in a group, and, if necessary, and also to the substrate in the vicinity of identifying elements, in the inspection zone.

When the article comprises, at least, one apparent quotation, the method can comprise the following steps of:

comparing an information representing the apparent quotation with the apparent quotation itself appearing on the article, concluding on the authenticity and/or identify of the article at least thanks to the comparison.

The apparent quotation can, for example, be an element such the name, the first name or age, or civil status of an individual.

Another aim of this invention, according to another of its aspects, is a system for authenticating and/or identifying a secure article, notably a security and/or valuable document, the article comprising:

at least one authenticating structure, at least one inspection zone defined at least partly by the authenticating structure, in the inspection zone, at least one identifying element different from the authenticating structure, at least one identification information linked to at least one feature, notably spatial and/or physical, in the inspection zone, and notably of said at least identifying element, the system comprising:

image analysis means, comprising notably one optical detection system, arranged for locating the inspection zone on the article, acquisition means of a feature, notably spatial and/or physical, of the inspection zone, and notably of identifying element(s) in the inspection zone located by image analysis means, as an option, a processing unit arranged for comparing the feature of the article inspection zone linked to the identification information, with at least one feature obtained thanks to acquisition means.

Another aim of the present invention, according to another of its aspects, is a method for manufacturing a secure article, notably a security and/or valuable document, from a sheet material, the sheet material comprising:

at least one substrate, at least one authenticating structure, at least one inspection zone defined at least partly by the authenticating structure, in the inspection zone, at least one identifying element different from the authenticating structure, the method comprising the following step of:

providing the sheet material with at least one identification information linked to at least one feature, notably spatial and/or physical, of the inspection zone, and notably of said at least identifying element of the inspection zone.

The above-mentioned manufacturing method can, further, comprise the following step of:

carrying out at least one print on the sheet material.

Another aim of the invention, according to another of its aspects, is a sheet material, especially for embodying the above-mentioned method, comprising:

at least one substrate, at least one authenticating structure interacting with the substrate, preferably visible by reflection, notably one fibre or one flake or a group of fibres and/or flakes, at least one inspection zone defined at least partly by the authenticating structure, notably by the outline of the fibre or the flake, in the inspection zone, at least one identifying element, different from the authenticating structure, the identifying element comprising particles or one active material.

The authenticating structure can be thus different from a printing, notably an alphanumerical printing or a bar code, carried out with a non optical variable ink.

BRIEF DESCRIPTION OF THE DRAWINGS

The present invention could be best understood when reading the following detailed description, the non-limiting exemplary embodiments of the invention and when examining the appended drawings, in which:

FIGS. 5 and 6 show, schematically and partly, security and/or valuable documents in compliance with other exemplary embodiments of the invention, FIGS. 7 and 7A show, schematically and partly, one fibre, respectively one flake that can be incorporated into a document in compliance with the invention FIG. 8 shows in a very schematic way, an authenticating and/or identifying system in compliance with the invention, FIG. 9 is a block diagram illustrating different steps of an authenticating and/or identifying method in compliance with the invention, FIG. 10 illustrates, schematically or partly, a step of retrieving data for authenticating and/or identifying a document in compliance with the invention, FIG. 11 shows, schematically or partly, identifying elements of a document in compliance with the invention, FIG. 12 shows, schematically or partly, a matrix code carried out from an active material.

DETAILED DESCRIPTION OF EMBODIMENTS

Figure 1:
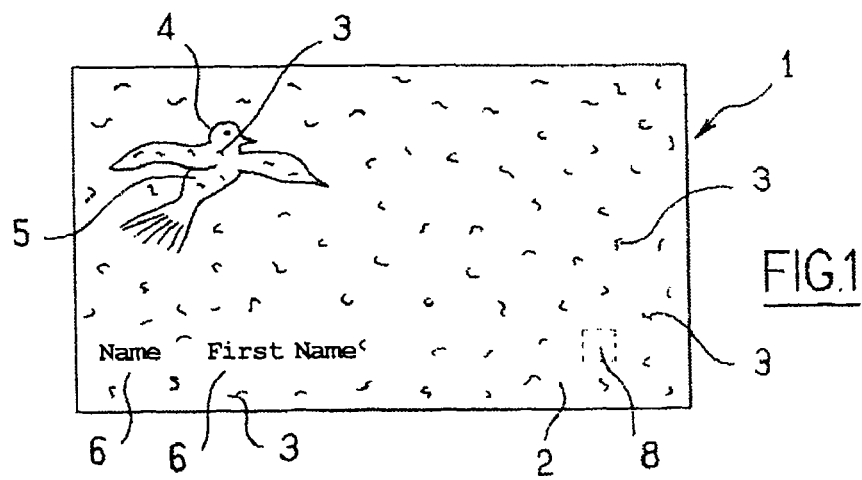
FIGS. 1 to 3 show, schematically and partly, security and/or valuable documents in compliance with different exemplary embodiments of the invention.

FIG. 1 shows a security and/or valuable document 1 in compliance with the invention, that can constitute one of the following elements: a banknote, a security paper, an identity document, a leaf or a passport cover, a visa, a coupon, a valuable document other than a banknote, for example a cheque or a credit card, a protecting and/or authenticating tag, a traceability tag, a packaging device, for example for one or several pharmaceutical specialties, this packaging device comprising for instance one blister.

The document 1 comprises one fibrous substrate 2 in the considered example, comprising for instance cellulose fibres and/or cotton linters and/or synthetic fibres.

Alternatively, the substrate 2 can be a plastic one.

In the described example, the substrate 2 incorporates in its mass, one plurality of identifying elements 3 randomly scattered on the whole surface of the substrate 2.

These identifying elements 3 comprise, for example, particles, notably luminescent and/or fluorescent, and/or fibres such as magnetic fibres, notably soft magnetic ones, or optically excitable fibres, notably by exposure to an infrared radiation.

These identifying elements 3 can be selected so that they could be detected with the naked eye, presenting for this purpose for example a sufficiently low size or an accurate reflectance.

The identifying elements 3 are arranged for emitting a specific signal when they are submitted to an adapted external excitation, notably optoelectronic, electromagnetic, electric, magnetic or thermal.

A watermark 4 delimiting an authenticating structure is achieved on the substrate 2, in a predetermined location of this one.

This watermark 4 can, for example, be obtained though an operation on the aqueous suspension of cellulose fibres when manufacturing the paper. Any other technique for achieving the watermark 4 can be, of course, used, which can be a pseudo-watermark.

The outline of watermark 4 delimits an inspection zone 5 later.

The identifying elements 3 randomly scattered within this inspection zone 5 delimit a single signature of the document 1.

The document 1 comprises apparent quotations 6, for example printed onto the substrate 2. These apparent quotations 6 comprise, for example, the name and the first name of an individual. The apparent quotations 6 can be of any type and comprise, for example one image.

The document 1 further comprises one data medium 8 including, in the considered example, one electronic device fitted with a chip able to store data.

The electronic device 8 can be fixed onto the substrate 2 in different ways, while being for example at least partly or totally incorporated within the substrate mass 2 or stuck onto an external side of this one.

The data medium 8 stores, on the one hand, at least one spatial and/or physical feature of identifying elements 3 scattered in the inspection zone 5, and on the other hand, information representing the apparent quotations appearing on the document 1.

The data stored by the data medium 8 can be encrypted in order to strengthen the security.

The physical feature linked to the identification information can correspond to an optical, electro-magnetic, electric, magnetic or thermal feature of identifying element(s) 3 in the inspection zone 5 and possibly of the substrate portion in the inspection zone 5.

The spatial feature linked to the identification information can be related to arrangement, size or the density per unit area of identifying element(s) 3 in the inspection zone 5.

The document authentication 1 can be simply carried out by observing, by transparency, the watermark 4, which constitutes a first-level security element.

The use of a specific apparatus for authenticating purpose is not necessary.

It may be desirable, if necessary, to carry out the document identification in addition to its authentication.

For this purpose, the single signature of the document 1 intervenes; it is formed by the identifying elements 3 scattered in the inspection zone 5.

The document 1 identification can be obtained by means of an appropriate system 100 illustrated in a very schematic way in FIG. 8.

This system 100 comprises:
one slit 101 enabling to insert the document 1 into a control space 102,
one optical detection system 103 comprising for example one camera, the system being arranged to locate, notably through image analysis, the inspection zone 5 of the document 1 inserted in the control space 102, this system functioning, for example in visible or infra-red light, and comprising for instance at least one light-emitting diode or one laser diode,
acquisition means 104 of a spatial and/or physical feature of identifying elements 3 in the inspection zone 5 located by the detection system 103, these means 104 can comprise notably one device such as one sensor or a set of sensors for measuring the intensity of a signal generated by the identifying elements 3 present in the inspection zone 5 when they are submitted to an external excitation,
one data processing unit 105 such as a computer, arranged for comparing the feature of identifying elements 3 of the document 1 linked to the identification information, with at least one feature obtained thanks to acquisition means 104.

In an exemplary embodiment of the invention, the system 100 can comprise one plurality of lighting sources, at least one functioning for example in the visible, being used to locate the inspection zone 5, and one or many other lighting sources being used to create multiple excitations of identifying element(s), these possible multiple excitations can be simultaneous or successive.

The system 100 can comprise, if necessary, filters for filtering excitation and/or emission wavelengths when the excitation source is electromagnetic.

The acquisition means 104 can comprise a photo-diode box when the signal emitted by the identifying elements is of electromagnetic type or of magneto resistive sensors in case the signal is of magnetic type.

In a non-illustrated alternative version, the system 100 can comprise one detection device including one camera, this device being arranged for both locating the inspection zone 5 of the document 1 and determining one spatial feature such as the area density and/or the spatial distribution of identifying elements 3 present in the inspection zone 5.

The document 1 identification can comprise the following steps.

Firstly, the document 1 is inserted into the control space 102 of the system 100.

The optical detection system 103 locates through image analysis the inspection zone 5 of the document 1 (step 120 in FIG. 9), by determining for example the outline of the watermark 4.

The acquisition means 104 determine one spatial and/or physical feature of identifying elements in the inspection zone 5 located by the detection system 103 (step 121), for example by measuring the intensity of a signal generated by the identifying elements 3 present in the inspection zone 5.

Then, the processing unit 105 compares (step 122) the measured signal intensity with a value linked to the identification information stored on the data medium 8 of the document 1.

When the identification rests on an optical detection, and notably when the acquisition means 104 comprise one camera, the comparison can especially deal with two images, one acquired on the document 1, at the inspection zone level, and the other retrieved thanks to the information contained in the data medium 8.

The information representing apparent quotations are compared with the apparent quotations 6 appearing on the document 1.

The above-mentioned comparisons enable to check the univocal relation between the apparent quotations 6 appearing on the document 1 and the substrate 2, and then the authenticity and the identity of the document 1 (steps 123 and 124).

In another exemplary embodiment of the invention, the useful information for identifying the document, namely the ones representing the spatial and/or physical feature and at least an apparent quotation, are not stored on the document 1 itself, being stored on one data medium 130 distinct from the document 1, as illustrated in FIG. 10.

This data medium 130 can, for example, be composed of one database of one computing system.

The identification information comprises then one identifier enabling to retrieve data linked to the considered document, stored on the data medium 130, by means of one terminal 131 such as a mobile phone or a personal digital assistant (PDA) or a computer or any other apparatus.

The terminal 131 can be connected to the database 130 through a cabled or non cabled link.

The document identification can be then carried out in this way.

The identifier is read and data useful for authenticating and/or identifying the document are retrieved, namely the data representing one spatial and/or physical feature of identifying elements 3 and apparent quotations. For retrieving the above-mentioned data, one user can transmit by means of one terminal 131 the document identifier to the system comprising the database 130, which, in return, sends towards the terminal 131 the required data, including for example one image 132 of the inspection zone 5.

The retrieved data enable to identify the document 1, in comparison with the spatial and/or physical feature determined on the document and the apparent quotations appearing on this one.

Obviously, it doesn't fall outside the scope of the present invention when the inspection zone is defined by an element other than one watermark.

Figure 2:
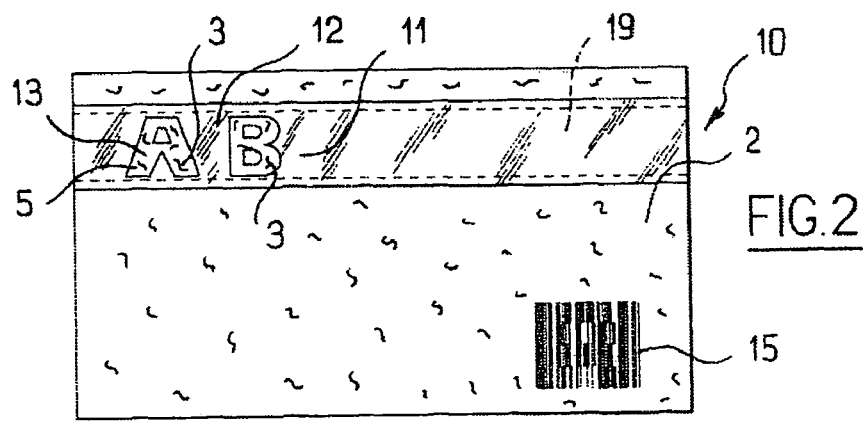

FIG. 2 illustrates one document 10 comprising one fibrous substrate as described in the previous example, and one foil 11 laid down onto one side of this substrate 2.

The foil 11 is applied on the document 10 through a transfer of a multilayer structure comprising one release coating by heat and pressure application.

In the illustrated example, the foil 11 comprises one metallization 12 and demetallized zones 13 that can form, notably patterns, for example alphabet characters. These zones 13 delimit windows. The inspection zone 5 used for identification corresponds, for instance, to demetallized zones 13. In a non illustrated alternative version, the demetallized zones 13 can be replaced by punched zones of the foil 11.

In the considered example, the identifying elements 3 such as fibres are scattered, notably at random, on the whole surface of the substrate 2. Alternatively, the fibres 3 are scattered on only one delimited zone 19 of the substrate 2. This zone 19 presents, for example, one strip shape.

The identifying elements 3 are laid down, notably by means of one or several appropriate strip nozzles on the cellulose dispersion, when forming the substrate 2, for example.

The foil 11 can entirely cover, if desired, this zone 19 of the substrate 2.

The foil 11 enables to screen one excitation signal outside the inspection zone 5.

The document 10 comprises one data medium 15 consisting in, for example, a bar code that can be of matrix type, for instance the one known named as PDF 417, enabling to store a relatively important quantity of data.

In the example of FIG. 1, the identifying elements 3 are scattered in the substrate 2 mass, on its whole surface.

Figure 3:
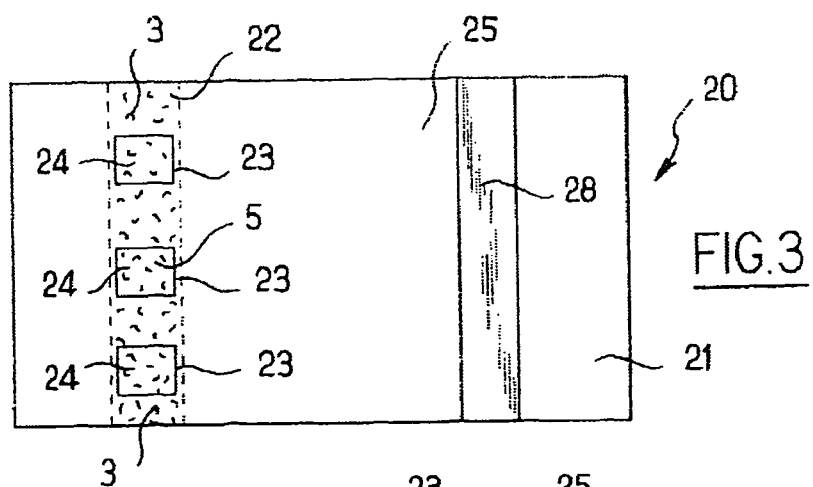

FIG. 3 illustrates one document 20 comprising one fibrous substrate 21 wherein one strip security element 22, notably in plastic, is incorporated when manufacturing the substrate 21.

The strip element 22 carries a plurality of identifying elements 3 randomly scattered on its whole surface.

The substrate 21 comprises windows 23 leaving on one side 25 of the substrate 20 some zones 24 of the strip element 22 clear.

Between these zones 24, the strip element 22 is drowned in the substrate 21 mass.

In the illustrated example, the windows 23 present a rectangular shape with a width inferior to the width of the strip element 22.

The substrate 21 can comprise windows 23 on only one side 25.

Figure 4:
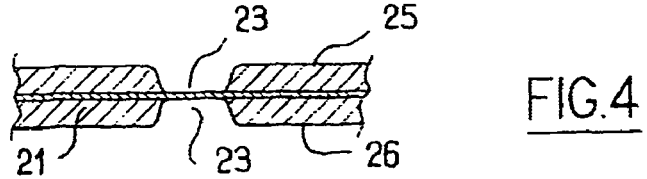
FIG. 4 is a transverse, schematic and partial cross-section of a document in compliance with one exemplary embodiment of the invention.

Alternatively, as illustrated in FIG. 4, the substrate 21 can comprise opposite windows 23 leaving the strip element 22 clear on both opposite sides 25 and 26 of the document 20.

Notably, reference can be made to the EP 690 939 patent concerning the method of manufacturing the windows.

The inspection zone 5 used for identifying the document 20 is formed by exposed zones 24 of the strip element 22, at right angles with windows 23 of the substrate 21.

The document 20 comprises one medium data formed for example by one magnetic track 28 on which are stored the data useful for identifying the document 20.

FIG. 5 shows one document 30 in compliance with the invention, comprising one bi-jet paper 31 formed by one first jet 32 and one second jet 33. The first jet 32 comprises windows 34 and the second jet 33 incorporates some identifying elements 3 in its mass.

In the illustrated example, the inspection zone 5 is defined by the windows 34.

The identifying elements 3 can be, alternatively, laid down between both jets 32 and 33, for example by spraying, before a lamination step of these both jets 32 and 33.

The document 30 comprises one identifier 36 enabling to retrieve from the distinct data medium 130 the data necessary for identifying the document 30.

FIG. 6 illustrates one document 40 in compliance with the invention, comprising one fibrous substrate 41, incorporating a plurality of identifying elements 3.

One surface application 42 is laid down onto the substrate 41; this coating can be of iridescent type, for example.

This coating 42 presents a variable thickness delimiting for instance zones of reduced thickness 43 forming inspection zones 5 and having a variable optical effect different from the one of the neighbouring zones.

The identifying elements 3 can be selected among:
the particles Traceless™ from the CREO Company,
the particles Nanoplex® from the NANOBAR-CODES Company, the particles Polystar™ from the SPECTRA SYSTEMS Company, the particles Microtag from the MICROTAG Company.

Example of Authenticating Structures and Identifying Elements According to the Invention FIG. 7 illustrates one security fibre 51 carrying identifying elements 50.

The fibre 51 is carried out as follows:

When spinning one viscose filament designed for achieving security fibres 51, is added to the viscose masterbatch, one luminescent substance, for example invisible in daylight and fluorescent at 365 nm, usable for authentication as well as a quantity of particles 50 Traceless™ from CREO sufficient for having at least two distinct particles Traceless™ for each staple fibre of 5 mm, for identification. These staple fibres are then inserted at random into one paper substrate. The luminescent fibre 51 delimits a second-level authenticating structure that can be authenticated by means of a Wood lamp. The identifying elements are defined by the particles Traceless™ scattered in each fibre. These particles can be identified on one fibre by comparing the spectral response of the fibre with the expected one. In case of doubt about the authenticity of luminescent fibres and most particularly in case of any suspicion of counterfeiting luminescent fibres by printing, an identification of the features of particles Traceless™ is carried out in the security fibres. In this case, the inspection zone 5 is formed by the outline of the fibre 51.

Example of Security and/or Valuable Document According to the Invention

In order to strengthen the document security, this one can comprise two types of authenticating structures. The document substrate comprises, for example, at random, luminescent fibres 51 including identifying elements formed by the particles Traceless™ from CREO. One holographic foil with reserves is applied onto the paper substrate. The document identification rests, on the one hand, on the optical detection of particles Traceless™ individually, located in one inspection zone defined by a fibre present in a foil reserve, and on the other hand, on the distribution of fibres 51 in the foil reserve. One inspection zone is then formed both by the outline of each fibre 51 and by the reserve formed in the foil. The document identification can thus be based on the combination of physical and spatial features of fibres 51 randomly scattered in the delimited zone by the reserve in the foil. The spectral image of this zone under infrared excitation can be obtained and compared with the expected one for identification purpose.

Other Example of Authenticating Structures and Identifying Elements According to the Invention A matrix code 140 (see FIG. 12) achieved from one active material developed by the HYPERLABEL TECHNOLOGIES company can be used. This active material formulated in an ink invisible to the naked eye is printed, by ink jet printing, on a coloured low weight paper that is then cut for creating some flakes, having for example the disc shape. The printing is carried out, so that each flake, for example with a diameter of 2 mm, could carry the same matrix code. The coloured flakes, after scattering in the paper, intended for example for achieving a tag for a brand product, constitute an authenticating structure of first level. Each flake further defines one inspection zone for an identification security constituted by the matrix code. The code can be read on one flake for example by means of the chat/scanner pen functioning in infrared developed by HYPERLABEL Company. The pen is connected to a processing unit able to decode the matrix code and restore the recorded data into this code.

Other Example of Security and/or Valuable Document According to the Invention The identifying elements are laid down onto a strip element incorporated into one paper substrate. The identifying elements are, for example, micrometric particles Nanoplex® with a variable reflectance marketed by NANOBARCODES Company. The mixture of both types of particles with different reflectance properties is used. The strip element is rolled with an authenticating structure such as a foil presenting one demetallized zone serving as inspection zone of fibres Nanoplex®. In this inspection zone, an image analysis is automatically carried out. This analysis rests on the respective percentage of each type of particles as well as on their distribution in the inspection zone.

The invention is not limited to exemplary embodiments that have just been described.

As illustrated in FIG. 11, the document can comprise one plastic substrate 60, for example in transparent resin, notably a hardenable resin, substrate wherein heterogeneous elements 61 are formed.

These heterogeneous elements 61 correspond, for example, to lacks of material or gas bubbles obtained when manufacturing the substrate 60 and randomly scattered within this substrate 60.

The heterogeneous elements 61, in one inspection zone defined for example by one or several windows of a film or foil applied onto the substrate form the identifying elements delimiting a signature of the document.

Figure 13:
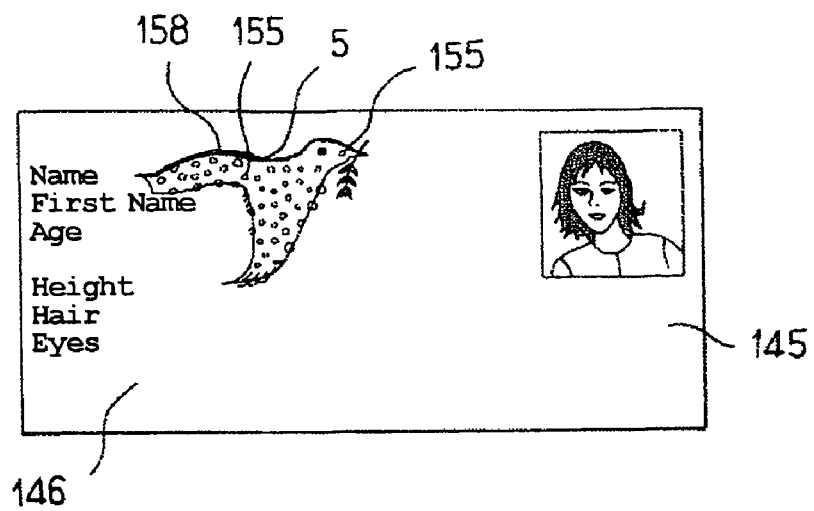
FIG. 13 shows, schematically or partly, one document in compliance with one exemplary embodiment of the invention.

FIG. 13 shows one document 145 comprising one substrate 146 in compliance with another exemplary embodiment of the invention.

Figure 15:
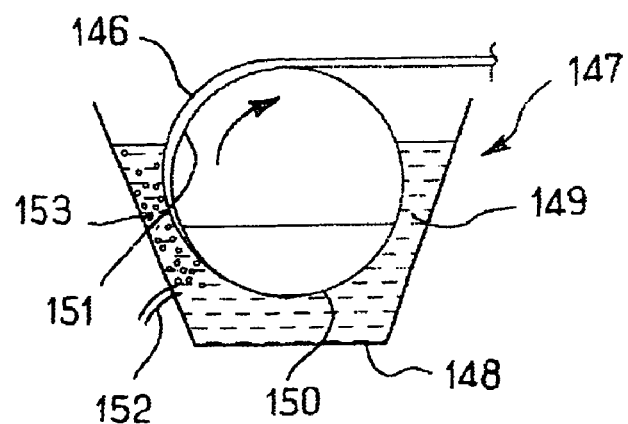
FIG. 15 shows, schematically or partly, a manufacturing step of a fibrous layer of an article in compliance with the invention.

The substrate 146 is a fibrous coating formed by means of a round-shaped paper making machine 147, as illustrated in FIG. 15.

This machine 147 comprises one vat 148 containing one suspension 149 of fibres, for example cellule fibres and/or cotton linters and/or synthetic and/or artificial fibres, wherein a rotating clothing cylinder 150 is partly immersed, delimiting one surface 151 in contact with which the fibrous coating 146 is continuously formed.

One duct 152 is provided for generating an air supply within the suspension of fibres 149 in order to form air bubbles 153.

The latter produce heterogeneous elements 155, within the fibrous coating 146 as very schematically illustrated in FIG. 13.

Of course, the heterogeneous elements 155 can be formed by any other appropriate means, notably according to the manufacturing process of the substrate 146.

In the considered example, the substrate 146 is carried out on the basis of paper fibres.

Any heterogeneous element 155 corresponds to a visible clear spot by transparency, in transmitted light, with a mass density inferior to the one of the rest of the substrate 146.

The number of heterogeneous elements 155 per unit area and/or the average size of heterogeneous elements can be controlled by adjusting, for example, the flow of air leakage in the suspension of fibres 149.

Because of their random distribution within the substrate 146 or in several fields of this one, the heterogeneous elements 155 in the inspection zone 5 defined by the watermark 158, form a single signature associated with the substrate 146.

Figure 14:
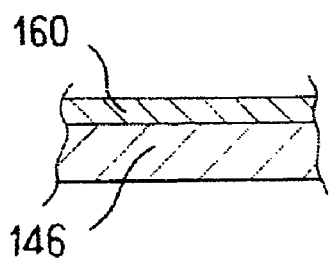
FIG. 14 illustrates schematically, in cross-section, an article in compliance with one exemplary embodiment of the invention, comprising a surface layer.

As shown in FIG. 14, heterogeneous elements may be generated within a surface layer 160 when applying the surface layer on the previously formed substrate 146, the heterogeneous elements corresponding to mass density fluctuations of layer 160. These mass density fluctuations may be caused, for example, by a release of the gases trapped within substrate 146 during the drying phase, whereby the gases released by the substrate penetrate the surface layer or, alternatively, by intentional injection of gases within the still wet surface layer 160, before or when it is applied to the substrate. These heterogeneous elements of surface layer 160 generate optical density fluctuations.

Examples of Documents in Compliance with the Invention

Figure 16:
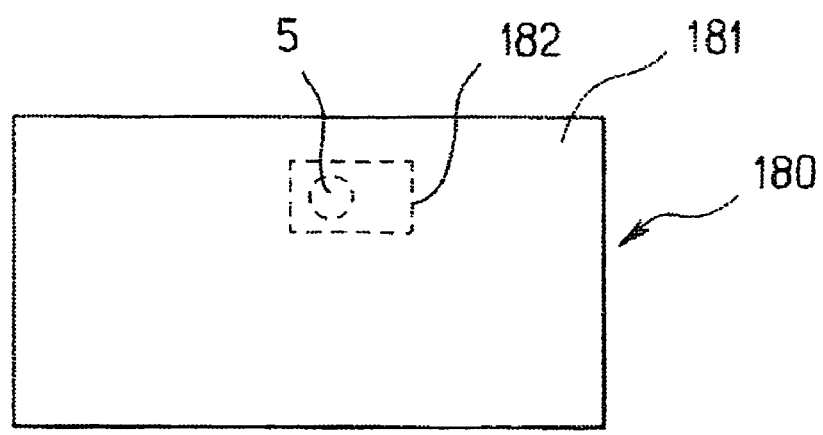

FIG. 16 shows one document 180 comprising one fibrous substrate 181, without adding distinct identifying elements in or onto the substrate 181, presenting an authenticating structure such as a clear watermark 182 of rectangular type, that both serves as a first level authenticating structure and a reference point for determining one inspection zone 5 (by optical contrast of the clear zone with respect to the rest of the substrate). When identifying, the 3D topography of the fibrous substrate 181 serves for identification by its single signature. This single signature can be read by sensors such as the ones described by Escher Lab and Kodak, or the one presented by Russel Cowburn from the Imperial College of London in the document entitled "Secure fingerprint of packaging and documents with tags, chips or ink". This last sensor rests on one "scanner" examining the specific features of absorbing a visible radiation by the substrate in a given zone.

The optical sensor can be arranged for locating the outlines of a watermark 182 and, inside the defined zone by the watermark, determining a small inspection zone 5 of the fibrous substrate, the inspection zone 5 being in this case smaller than the defined zone by the outline of the watermark.

Figure 17:
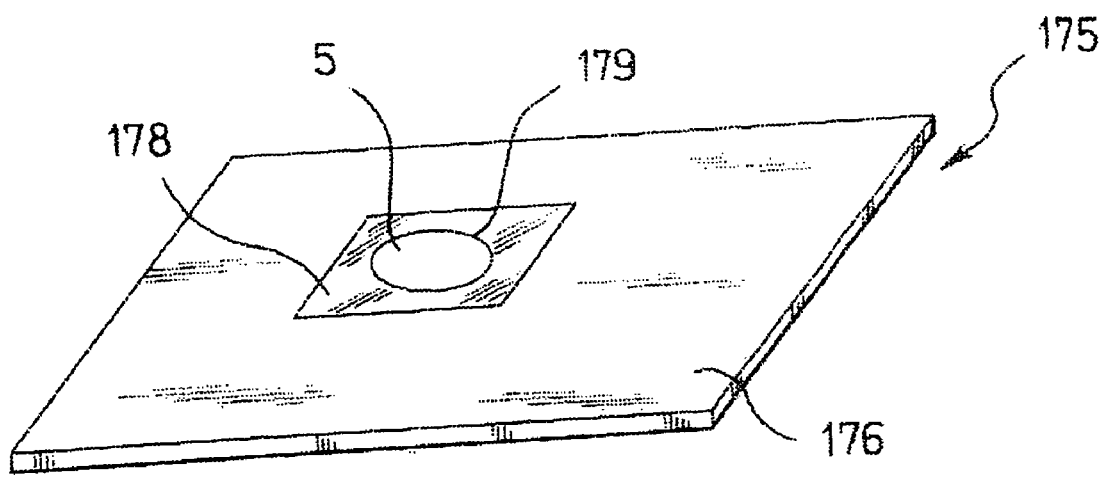
FIGS. 16 and 17 illustrate, schematically and partly, documents in compliance with exemplary embodiments of the invention.

FIG. 17 shows one document 175 comprising one paper substrate 176.

A foil or film 178 is fixed onto the substrate side 176, this foil or film 178 having one window 179. In the considered example, the foil or film 178 delimits an authenticating structure and the window 179 an inspection zone 5.

The inspection zone 5 is, preferably, far from corners and/or borders of the document that are liable to be folded and/or damaged during the document lifetime.

The document identification 175 or 180 is based on the 3D analysis of the paper substrate surface 176, in the inspection zone 5.

The analysis can rely, for example, on a laser scanning of the inspection zone 5 with a submicron resolution. The 3D topography of the paper in the inspection zone 5 delimits a single signature of the document.

Obviously, the features of the different described embodiments can be combined between themselves within the non illustrated alternative versions.

For example, the electronic device 8 of the document 1 described by referring to FIG. 1, can be replaced by the bar code 15 of the document 10 in FIG. 2.

In the non-illustrated examples, the illustrated articles, notably in FIGS. 1 to 6, do not comprise the identification information, this one being differently associated with the article.

The expression "comprising one" is synonymous with "comprising at least one", unless otherwise specified.

The invention claimed is:

1. A secure article comprising:
at least one substrate,
at least one visible authenticating structure,
at least one inspection zone defined at least partly by the at least one visible authenticating structure, the at least one visible authenticating structure delimiting at least partly an outline of the at least one inspection zone and/or serving to locate the at least one inspection zone,
one plurality of identifying elements that are arranged in the at least one inspection zone, and that are different from the at least one visible authenticating structure, the at least one inspection zone enabling identification of the secure article based on an identification information to be supplied with at least one feature of the identifying elements,
at least an identification information associated with at least one feature of the inspection zone, said information being relative to one spatial and/or physical feature of said identifying elements, the identifying elements being randomly scattered within the inspection zone and/or arranged for emitting one specific signal when submitted to one external excitation.

2. The secure article according to claim 1, the at least one substrate being fibrous.

3. The secure article according to claim 1, the identification information being related to the spatial distribution of said plurality of identifying elements.

4. The secure article according to claim 3, the secure article including a plurality of identifying elements, the identification information being related to a spatial distribution of the plurality of identifying elements.

5. The secure article according to claim 1, wherein the secure article further includes a plurality of randomly scattered identifying elements within the at least one inspection zone, and the identification information presents a link to a feature of the plurality of identifying elements.

6. The secure article according to claim 1, wherein the at least one visible authenticating structure is located in a predetermined location in the secure article.

7. The secure article according to claim 1, wherein the at least one visible authenticating structure is located in a random location in the secure article.

8. The secure article according to claim 1, wherein the at least one visible authenticating structure is detectable with a naked eye, by reflection and/or transparency, in visible light.

9. The secure article according to claim 1, wherein the at least one visible authenticating structure is detectable with a naked eye by transparency, under a predetermined ultraviolet lighting, the at least one visible authenticating structure being undetectable in visible light.

10. The secure article according to claim 1, wherein the at least one identifying element is undetectable by a naked eye.

11. The secure article according to claim 1, wherein the at least one identifying element is capable of emitting a specific signal when submitted to an external excitation.

12. The secure article according to claim 11, wherein a physical feature linked to the identification information corresponds to an optical, electromagnetic, electric, magnetic, thermal or acoustic feature of the at least one identifying element in the at least one inspection zone.

13. The secure article according to claim 1, wherein the at least one feature linked to the identification information is related to arrangement, size or density per unit area or per volume unit of the at least one identifying element in the at least one inspection zone.

14. The secure article according to claim 1, wherein the at least one visible authenticating structure comprises a medium including the at least one identifying element.

15. The secure article according to claim 14, wherein the medium includes at least one strip element with a width less than a width of the secure article, the strip element being incorporated at least partly into the at least one substrate of the secure article.

16. The secure article according to claim 15, wherein the secure article comprises at least one window through which the at least one strip element is at least partly exposed to outside, the at least one inspection zone being defined at least partly by the window.

17. The secure article according to claim 14, wherein the medium comprises at least one fiber or one flake, and the at least one inspection zone is defined at least partly by an outline of the at least one fiber or the at least one flake.

18. The secure article according to claim 17, wherein the at least one visible authenticating structure comprises at least one fiber, the at least one fiber carrying a plurality of particles forming the at least one identifying element.

19. The secure article according to claim 18, wherein the at least one visible authenticating structure includes at least one paper-based flake.

20. The secure article according to claim 1, wherein the secure article comprises at least one first authenticating structure of and a plurality of second authenticating structures, the plurality of second authenticating structures being different than the at least one first authenticating structure.

21. The secure article according to claim 1, an outline of the at least one inspection zone being a perimeter of the at least one visible authenticating structure.

22. The secure article according to claim 1, wherein the at least one identifying element is scattered within an article zone having an area greater than an area of the at least one visible authenticating structure, the at least one identifying element being scattered all over a surface of the secure article.

23. The secure article according to claim 1, wherein the at least one substrate is fibrous and incorporates or carries the at least one identifying element.

24. The secure article according to claim 1, wherein the secure article includes a plurality of identifying elements that are randomly scattered within the at least one substrate in an area zone being less than a substrate area, the area zone defining a strip shape.

25. The secure article according to claim 1, wherein the at least one visible authenticating structure and the at least one substrate are distinct.

26. The secure article according to claim 25, wherein the at least one visible authenticating structure is laid down on a face of the at least one substrate, the at least one visible authenticating structure comprising a strip or a patch.

27. The secure article according to claim 25, wherein the at least one visible authenticating structure comprises at least one window delimiting at least partly the at least one inspection zone, the at least one window being formed by a demetallized zone or a punched zone of the at least one visible authenticating structure.

28. The secure article according to claim 25, wherein the at least one visible authenticating structure comprises a coating laid down onto the at least one substrate, the coating presenting zones of variable thickness arranged for delimiting the at least one inspection zone.

29. The secure article according to claim 25, comprising a bi-jet paper, wherein a first jet defines the at least one substrate, the at least one visible authenticating structure including at least one window arranged in a second jet and delimiting at least partly the at least one inspection zone.

30. The secure article according to claim 1, wherein the at least one visible authenticating structure is at least partly on the at least one substrate.

31. The secure article according to claim 30, wherein the at least one visible authenticating structure comprises at least one watermark on the at least one substrate.

32. The secure article according to claim 1, wherein of the at least one identifying element is selected from the group consisting of:
    an active material,
    a particle,
    a fiber, and
    a 3D microstructure of a paper substrate.

33. The secure article according to claim 32, wherein:
    the active material is an ultraviolet absorber chemical compound or an element capable of being detected by X-ray fluorescence,
    the particle is luminescent, and
    the fiber is magnetic or capable of being optically excited.

34. The secure article according to claim 1, wherein the at least one substrate is a plastic substrate, the at least one identifying element is formed by heterogeneous elements in the plastic substrate, the plastic substrate lacking foreign material or gas bubbles.

35. The secure article according to claim 1, wherein the at least one visible authenticating structure is selected from the group consisting of:
    a watermark,
    a fiber,
    a flake,
    a film,
    a printed foil, and
    a print having variable optical effect.

36. The secure article according to claim 35, wherein:
    the fiber is capable of appearing colored under an illumination light,
    the flake is metallic or holographic, the flake being capable of appearing under the illumination light,
    the film is metallic or holographic, and
    the printed foil is metallic or holographic.

37. The secure article according to claim 1, wherein the at least one visible authenticating structure is different from print of an ink that is visible in white light.

38. The secure article according to claim 1, wherein the identification information includes a spatial and/or physical feature.

39. The secure article according to claim 1, further comprising a data medium, the data medium storing a spatial and/or physical feature of the at least one identifying element.

40. The secure article according to claim 1, wherein the identification information includes an image of the at least one identifying element contained in the at least one inspection zone.

41. The secure article according to claim 1, wherein the identification information is encrypted.

42. The secure article according to claim 1, further comprising at least one data medium capable of storing the identification information.

43. The secure article according to claim 42, wherein the at least one data medium is selected from the group consisting of:
    an optical device,
    an electronic device capable of storing data,
    a magnetic track, and
    an optical memory.

44. The secure article according to claim 43, wherein:
the optical device is a bar code, and
the electronic device is a chip.

45. The secure article according to claim 1, further comprising at least one apparent quotation.

46. The secure article according to claim 45, wherein the identification information permits access to a piece of information representing the at least one apparent quotation of the secure article.

47. The secure article according to claim 1, wherein the secure article comprises at least one paper substrate.

48. Article The secure article according to claim 1, wherein the at least one visible authenticating structure is different than a printed mark, the at least one visible authenticating structure being formed with a non optical variable ink and delimiting at least partly or enabling location of the at least one inspection zone.

49. The secure article according to claim 1, said external excitation being optoelectronic, electromagnetic, electric, magnetic, thermal or acoustic.

50. The secure article according to claim 1, wherein the identifying elements define a sole signature of the secure article based either exclusively on the identifying elements present in the inspection zone, or on combination of the identifying elements in the inspection zone and the portion of substrate in the inspection zone.

51. A method for authenticating and/or identifying a secure article, the secure article including:
at least one authenticating structure,
at least one inspection zone defined at least partly by the at least one authenticating structure,
at least one identifying element that is arranged in the at least one inspection zone, and that is different from the at least one authenticating structure,
at least one piece of identification information linked to at least one feature of said at least one identifying element,
the method comprising at least one of authentication and identification of the secure article,
wherein the authentication of the secure article comprises the following steps of:
applying a lighting condition to the authenticating structure and observing the at least one authenticating structure by reflection and/or transparency, under said lighting condition,
determining that the secure article is authentic based on the observation,
the identification of the secure article comprises the following steps of:
reading the identification information, said identification information being not directly comprehended,
using a processor to compare the at least one piece of identification information linked to the at least one feature of the at least one inspection zone with at least one feature obtained from the at least one inspection zone,
determining the identification of the secure article based on the comparison.

52. The method according to claim 51, wherein the identification of the secure article is automatically carried out.

53. The method according to claim 51, further comprising the step of:
locating the at least one inspection zone through image analysis of the secure article.

54. The method according to claim 51, wherein the secure article comprises the identification information, the identification information being read when identifying the secure article before comparing the at least one piece of identification information linked to the at least one feature of the at least one inspection zone with the at least one feature obtained from the at least one inspection zone, the identification of the secure article further comprising the step of:
comparing an arrangement of the at least one identifying element in the at least one inspection zone with an image retrieved from the identification information.

55. The method according to claim 51, the identification of the secure article further comprising the steps of:
measuring a signal intensity and/or determining a type of signal generated by the at least one identifying element in the at least one inspection zone, under a condition in which the at least one identifying element is submitted to an external excitation,
comparing the signal intensity and/or the type of signal with a piece of data retrieved from the identification information.

56. The method according to claim 51, the secure article further including at least one apparent quotation, the method further comprising the steps of:
comparing information representing the apparent quotation with the apparent quotation appearing on the secure article,
determining the authenticity and/or the identification of the secure article based on the comparison.

57. The method according to claim 51, wherein the article comprises one plurality of identifying elements, the identifying elements being randomly scattered within the inspection zone and/or arranged for emitting one specific signal when submitted to one external excitation.

58. The method according to claim 51, wherein the identification information is encrypted.

59. A system for authenticating and/or identifying a secure article, the secure article including:
at least one authenticating structure,
at least one inspection zone defined at least partly by the at least one authenticating structure,
at least one identifying element different from the at least one authenticating structure that is arranged in the at least one inspection zone, the secure article being associated with at least an identification information linked to at least one feature of the at least one inspection zone,
at least one data medium able to store the identification information, the system comprising:
an image analysis unit for locating the at least one inspection zone on the secure article,
an acquisition unit for acquiring a feature of the at least one identifying element in the at least one inspection zone located by the image analysis unit.

60. The system for authenticating and/or identifying the secure article according to claim 59, further comprising:
a processing unit for comparing the at least one piece of identification information linked to the at least one feature of the at least one inspection zone with the at least one feature obtained from the at least one inspection zone obtained by the acquisition unit.

61. A sheet material comprising:
at least one first authenticating structure,
at least one first inspection zone defined at least partly by the at least one first authenticating structure,
at least one plurality of second authenticating structures, the at least one plurality of second authenticating structures being different from the at least one first authenticating structure, each second authenticating structure including a fiber or a flake, the plurality of second authenticating structures being scattered at random within the at least one first inspection zone, at least one second inspection zone defined at least partly by at least one of the plurality of second authenticating structures, at least one identifying element different from the plurality of second authenticating structures that is arranged in the at least one second inspection zone.

62. A method for manufacturing a secure and/or valuable document from a sheet material, the sheet material comprising:

at least one substrate, at least one authenticating structure, at least one inspection zone defined at least partly by the at least one authenticating structure, at least one identifying element that is arranged in the at least one inspection zone, the at least one identifying element being different from the at least one authenticating structure, the method comprising the step of:

providing the sheet material with at least one identification information linked to at least on feature of the at least one identifying element of the at least one inspection zone, said identification information comprising said spatial and/or physical feature in a not directly comprehended manner.

63. A sheet material comprising:

at least one substrate, at least one visible authenticating structure interacting with the at least one substrate, at least one inspection zone defined at least partly by the at least one visible authenticating structure, at least one identifying element that is arranged in the at least one inspection zone, the at least one identifying element being different from the at least one visible authenticating structure, the at least one identifying element comprising particles or one active material.

64. A method for authenticating and/or identifying a secure article, the secure article including:

at least one authenticating structure, at least one inspection zone defined at least partly by the at least one authenticating structure, at least one identifying element that is arranged in the at least one inspection zone, and that is different from the at least one authenticating structure, the article being associated with at least one piece of identification information linked to at least one spatial and/or physical feature of said at least one identifying element, the method comprising at least one of authentication and identification of the secure article, wherein the authentication of the secure article comprises the following steps of:

applying a lighting condition to the authenticating structure and observing the at least one authenticating structure by reflection and/or transparency, under said lighting condition, determining that the secure article is authentic based on the observation, the identification of the secure article comprises the following steps of:

reading the identification information, said identification information enabling to retrieve the spatial and/or physical feature stored on one distinct medium of the article, using a processor to compare the at least one piece of identification information linked to the at least one feature of the at least one inspection zone with at least one feature obtained from the at least one inspection zone, determining the identification of the secure article based on the comparison.

65. A system for authenticating and/or identifying a secure article, the secure article including:

at least one authenticating structure, at least one inspection zone defined at least partly by the at least one authenticating structure, at least one identifying element different from the at least one authenticating structure that is arranged in the at least one inspection zone, the secure article being associated with at least an identification information linked to at least one feature of the at least one inspection zone, at least an identification information associated with at least one spatial and/or physical feature of said at least one identifying element of the inspection zone, said identification information enabling to retrieve the spatial and/or physical feature stored on one distinct medium of the article, the system comprising:

an image analysis unit for locating the at least one inspection zone on the secure article, an acquisition unit for acquiring a feature of the at least one identifying element in the at least one inspection zone located by the image analysis unit.

66. A method for manufacturing a secure and/or valuable document from a sheet material, the sheet material comprising:

at least one substrate, at least one authenticating structure, at least one inspection zone defined at least partly by the at least one authenticating structure, at least one identifying element that is arranged in the at least one inspection zone, the at least one identifying element being different from the at least one authenticating structure, the method comprising the step of:

providing the sheet material with at least one identification information linked to at least one feature of the at least one identifying element of the at least one inspection zone, said identification information enabling to retrieve the spatial and/or physical feature stored on one distinct medium of the sheet material.

* * * * *